(12) United States Patent
Imholt et al.

(10) Patent No.: US 8,884,234 B2
(45) Date of Patent: Nov. 11, 2014

(54) PORTABLE DIRECTIONAL DEVICE FOR LOCATING NEUTRON EMITTING SOURCES

(75) Inventors: Timothy J. Imholt, Methuen, MA (US);
Peter C. Colby, Framingham, MA (US);
Peter Fisher, Cambridge, MA (US)

(73) Assignees: Raytheon Company, Waltham, MA (US); Massachusetts Institute of Technology, Cambridge, MA (US)

( * ) Notice: Subject to any disclaimer, the term of this patent is extended or adjusted under 35 U.S.C. 154(b) by 172 days.

(21) Appl. No.: 13/422,615

(22) Filed: Mar. 16, 2012

(65) Prior Publication Data

US 2013/0240741 A1    Sep. 19, 2013

(51) Int. Cl.
*G01T 1/20*    (2006.01)

(52) U.S. Cl.
USPC ........................................................ 250/362

(58) Field of Classification Search
USPC ........................................................ 250/362
See application file for complete search history.

(56) References Cited

U.S. PATENT DOCUMENTS

| | | | |
|---|---|---|---|
| 5,029,262 A | 7/1991 | Schulte | |
| 5,036,202 A | 7/1991 | Schulte | |
| 5,517,030 A * | 5/1996 | Nabais Conde et al. | 250/361 R |
| 5,880,469 A | 3/1999 | Miller | |
| 7,741,613 B1 * | 6/2010 | Mascarenhas et al. | 250/390.11 |
| 7,863,579 B2 | 1/2011 | Suhami | |
| 2001/0022585 A1 * | 9/2001 | Endo et al. | 345/427 |
| 2006/0017000 A1 * | 1/2006 | Martoff | 250/390.02 |
| 2009/0078881 A1 * | 3/2009 | Dangendorf et al. | 250/390.11 |
| 2010/0181488 A1 | 7/2010 | Pausch et al. | |
| 2010/0265078 A1 | 10/2010 | Friedman | |
| 2010/0301220 A1 * | 12/2010 | Ott et al. | 250/363.03 |
| 2011/0095194 A1 * | 4/2011 | Orava et al. | 250/370.05 |

OTHER PUBLICATIONS

Orientation. (2001). In Chambers 21st Century Dictionary. Retrieved from http://www.credoreference.com/entry/chambdict/orientation.*
Notification of Transmittal of the International Search Report and the Written Opinion of the International Searching Authority, or the Declaration; PCT/US2012/071916; Mar. 12, 2013.

\* cited by examiner

*Primary Examiner* — David P. Porta
*Assistant Examiner* — Abra Fein
(74) *Attorney, Agent, or Firm* — Cantor Colburn LLP

(57) ABSTRACT

An apparatus for determining a direction of travel of a neutron emitted from a source includes: a chamber containing (i) nuclei that recoil upon interaction with an incoming neutron and (ii) atoms capable of being ionized by the recoiled nuclei thereby releasing electrons; an electron-interaction material disposed at the chamber and configured to receive electrons released by the ionized atoms and to emit photons upon the interaction with the received electrons; an imager configured to form an image of photons emitted by the electron-interaction material, wherein the image comprises a path having the direction of travel of the incoming neutron; and an orientation sensor configured to sense an orientation of the imager in order to relate the direction of travel of the incoming neutron to the orientation of the imager.

19 Claims, 5 Drawing Sheets

US 8,884,234 B2

PORTABLE DIRECTIONAL DEVICE FOR LOCATING NEUTRON EMITTING SOURCES

BACKGROUND

The present disclosure relates generally to detecting neutrons and, more particularly, to locating neutron emitting sources.

Special Nuclear Material (SNM) is defined as the type of material that can be used to fabricate a nuclear weapon. Detection of this type of material with a sensor is a challenge due to a variety of false alarms. Many of the false alarms can be due to natural sources common in many locations and therefore difficult to avoid. Additionally, many of the false alarms are due to the phenomenology of the sensor design.

One way to detect SNM is to detect emitted gamma radiation, which comes from SNM sources. However, a large natural background of gamma radiation from cosmic sources and terrestrial sources, such as potassium-40 and Iron-55, can cause false alarms. In addition, the SNM may be shielded to greatly reduce emission of associated gamma radiation and, thus, reduce the likelihood of detection.

Alternatively, SNM may be detected by detecting neutrons emitted from the SNM. Various processes such as nuclear absorption and excitation exist for neutron detectors to detect neutrons. In the nuclear absorption process, a neutron is absorbed by the nucleus of some atom in a detector. This daughter nucleus will then decay emitting decay products such as charged particles or gamma radiation, which are subsequently detected. While this process can detect thermal neutrons, it may not be efficient at detecting fast neutrons emitted from SNM. Additionally, it may be desirable to detect fast neutrons emitted by contamination or radioactive leaks at nuclear power facilities or facilities handling nuclear materials.

In the nuclear excitation process, an incoming neutron will scatter from a nucleus of some atom in the detector. This moves this nucleus to an excited energy state from which it will return to a base state by emitting gamma radiation, which is then detected. These types of detectors have an inherent problem in that they are very good gamma ray detectors. They will detect noise such as typically all cosmic background radiation and all natural background gamma rays.

In addition to the above deficiencies, these types of neutron detectors typically do not provide any directional information leading to a point in space from where the detected neutrons came. Some types of neutron detectors used for homeland security purposes do not lend themselves to mobility, but are generally permanently installed or difficult to move. Hence, improvements in neutron detection technology and, particularly, in portable neutron detectors would be well appreciated in the homeland security industry as well as others.

SUMMARY

Disclosed is an apparatus for determining a direction of travel of a neutron emitted from a source. The apparatus includes: a chamber containing (i) nuclei that recoil upon interaction with an incoming neutron and (ii) atoms capable of being ionized by the recoiled nuclei thereby releasing electrons; an electron-interaction material disposed at the chamber and configured to receive electrons released by the ionized atoms and to emit photons upon the interaction with the received electrons; an imager configured to form an image of photons emitted by the electron-interaction material, wherein the image comprises a path having the direction of travel of the incoming neutron; and an orientation sensor configured to sense an orientation of the imager in order to relate the direction of travel of the incoming neutron to the orientation of the imager.

Also disclosed is a method for determining a direction of travel of a neutron emitted from a source. The method includes: receiving an incoming neutron using a chamber that contains a nucleus that recoils along a direction of travel of the incoming neutron upon interacting with the incoming neutron; ionizing atoms in the chamber to release electrons along the direction of travel of the incoming neutron; emitting photons from an electron-interaction material upon interacting with the released electrons along the direction of travel of the incoming neutron; creating an image of the emitted photons using an imager, the image comprising a path having the direction of travel of the incoming neutron; and sensing an orientation of the imager using an orientation sensor coupled to the imager in order to relate the direction of travel of the incoming neutron to the orientation of the imager.

Further disclosed is a non-transitory computer readable medium comprising computer executable instructions for determining a direction of travel of a neutron emitted from a source by implementing a method that includes: receiving an image created by an imager comprising a path having the direction of travel of the neutron; receiving an orientation sensed by an orientation sensor attached to the imager in order to relate the direction of travel of the incoming neutron to the orientation of the imager; and determining the direction of travel of the neutron using the received image and the received orientation.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

A detailed description of one or more embodiments of the disclosed apparatus and method is presented herein by way of exemplification and not limitation with reference to the Figures.

Figure 1:
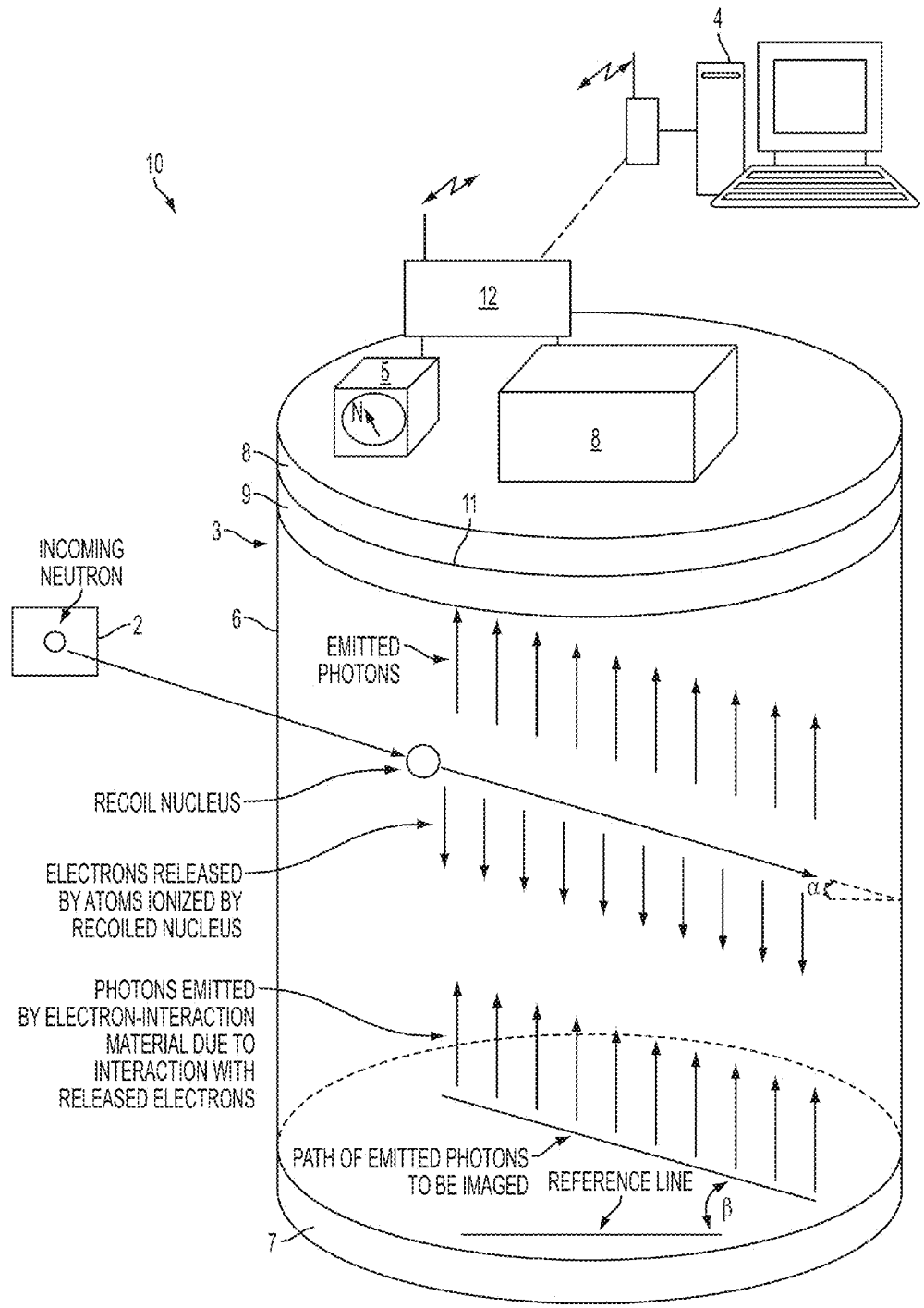
FIG. 1 is an exemplary embodiment of a portable neutron detection system for locating a neutron emitting source.

FIG. 1 illustrates an exemplary embodiment of a system 10 for determining a location of a neutron emitting source by determining a direction of a neutron from a neutron emitting source 2. The system 10 includes a neutron detector 3 coupled to a processing system 4. An orientation sensor 5 is also coupled to the neutron detector 3 and the processing system 4.

The neutron detector 3 is configured to detect an incoming neutron with a measurement of the detected neutron that is sensitive to the energy and direction of the detected neutron. The direction includes a two-dimensional direction (e.g., direction in horizontal plane) or a three-dimensional direction (e.g. horizontal and vertical direction). In order to detect an incoming neutron, the neutron detector 3 includes a chamber 6 containing a gas having various constituents. In one or more embodiments, the gas contains a combination of $CF_4$ and Helium-4. When an incoming neutron enters the chamber, at some point it may undergo an elastic scattering interaction with a nucleus of one of the gaseous atoms. As a result of the interaction, the nucleus may recoil in substantially the same direction as the direction of travel of the incoming neutron. In addition, the recoiled nucleus may gain energy corresponding to the energy of the incoming neutron. The recoiled nucleus may then ionize atoms of the ionization gas contained in the chamber 6 to release electrons that interact with an electron-interaction material 7. The ionization gas can be any gas such as $CF_4$ that can be ionized by the recoiled nucleus. Upon interacting with the released electrons, the electron interaction material 7 may emit photons along the same direction as that of the received electrons. The emitted photons in turn are received by an imager 8, which forms an image of the received photons. The imager 8 includes a lens 9 configured to focus the received photons onto an imaging plane 11. In one or more embodiments the imager 8 is a charge-coupled device (CCD) camera. In one or more embodiments, the image is formed by photon receptive pixels in a semiconductor sensor. It can be appreciated that the imager 8 can be any electronic camera, device or sensor that can record an image of the received photons and transmit that image to the processor 4. In the embodiment of FIG. 1, the electron interaction material 7 is in the form of a plate and the imaging plane 11 is parallel to the plane surface of the plate.

The electron-interaction material 7 may be any material that will emit photons upon interacting with incoming electrons. In one or more embodiments, the electron-interaction material 7 is a scintillator such as any scintillator known in the art, preferably having a high cross-section for electrons. In one or more embodiments, the electron-interaction material 7 is made of a metal and has a structure such that the metallic structure will emit photons (such as in the form of sparks) when the incoming electrons strike the metal. In one non-limiting embodiment, the metallic structure may be a copper screen mesh. In one or more embodiments, the electron-interaction material includes an electron-amplifier region that may be created by a voltage gap in the electron-interaction material 7. The electron-amplifier region is configured to initiate an avalanche of electrons from one or more received electrons.

Figure 2:
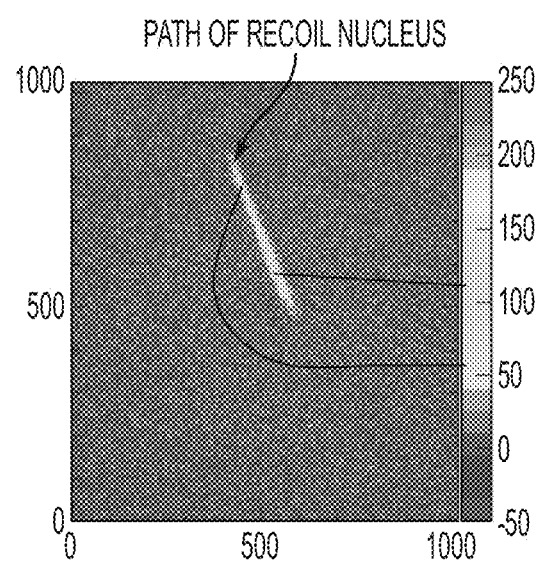
FIG. 2 is an exemplary illustration of an image of a path of a recoiled nucleus having a direction substantially the same as an incoming neutron.

It can be appreciated that the atoms of the ionization gas are ionized by the recoil nucleus along the direction of travel of the incoming neutron. Accordingly, the electrons released by the ionization are released also along the direction of travel of the incoming neutron. The electrons interacting with the electron-interaction material 7 also interact along the direction of travel of the incoming neutron and, thus, the emitted photons are emitted along the direction of travel of the incoming neutron. In turn, the imager 8 forms an image of the emitted photons that depicts the direction of the incoming neutron. It can be appreciated that the incoming neutron may enter the neutron detector 3 at various angles. As long as the direction of the incoming neutron has a component that is parallel to a plane of the electron-interaction material 7, the imager 8 may capture an image that provides that directional component in two dimensions. An exemplary image of a path of a recoiled nucleus is illustrated in FIG. 2. It can be appreciated that the path or streak of light will be brighter at the start of the track due to the recoiled nucleus having more energy to ionize more atoms than at the end of the track. The length of the path or streak may be related to the energy of the incoming neutron. Accordingly, the energy of the incoming neutron can be determined by analyzing the intensity and/or length of the imaged path or streak of light.

In one or more embodiments, the neutron detector 3 can determine the direction of the incoming neutron in three dimensions. The third dimension such as an angle $\alpha$ (i.e., vertical angle) from the horizontal plane (when image plane is horizontal) may be determined by at least one of several techniques. In the first technique, the total number of photons emitted from the electron-interaction material 7 and received by the imager 8 is counted using the imager 8 and the processor 4. The total number of photons counted is related to the total energy of the recoiled nucleus, which is related to the energy of the incoming neutron. Thus, the total number of photons counted provides a measure of the total energy of the incoming neutron. The three-dimensional path length of the recoiled nucleus also provides a measure of the total energy of the recoiled nucleus and, thus, the energy of the incoming neutron. Hence, the total number of photons counted provides an expected three-dimensional path length of the recoiled nucleus. Next, a length of the two-dimensional path or streak of light imaged by the imager 8 may be measured by, for example, counting pixels in an electronic imager and accounting for the pixel pitch. The measured length of the imaged two-dimensional path is then compared to the expected three-dimensional path length of the recoiled nucleus. If the imaged path length is the same as the expected path length, then the vertical angle is zero, such that the direction of the incoming neutron is parallel to the plane of the electron-interaction material 7 and the imaging plane 11. As the vertical angle increases, the length of the expected three-dimensional path of the recoiled nucleus will be greater than the two-dimensional path or streak of light imaged by the imager 8. Hence, if the vertical angle is $\alpha$, the expected path length is EL and the measured path length is ML, then $\alpha$ can be solved for in the equation, cosine $(\alpha)$=ML/EL.

In lieu of or in combination with the geometric analysis, the neutron detector 3 can be calibrated in a laboratory using incoming neutrons of known energies entering at various vertical angles and recording imager responses for the various angles. In embodiments where the types of Special Nuclear Materials (SNM) of interest are known such as, for example, Pu-239, U-233, U-235, and etc., the neutron detector 3 may be specifically calibrated for energies of neutrons emitted by these materials.

Figure 3:
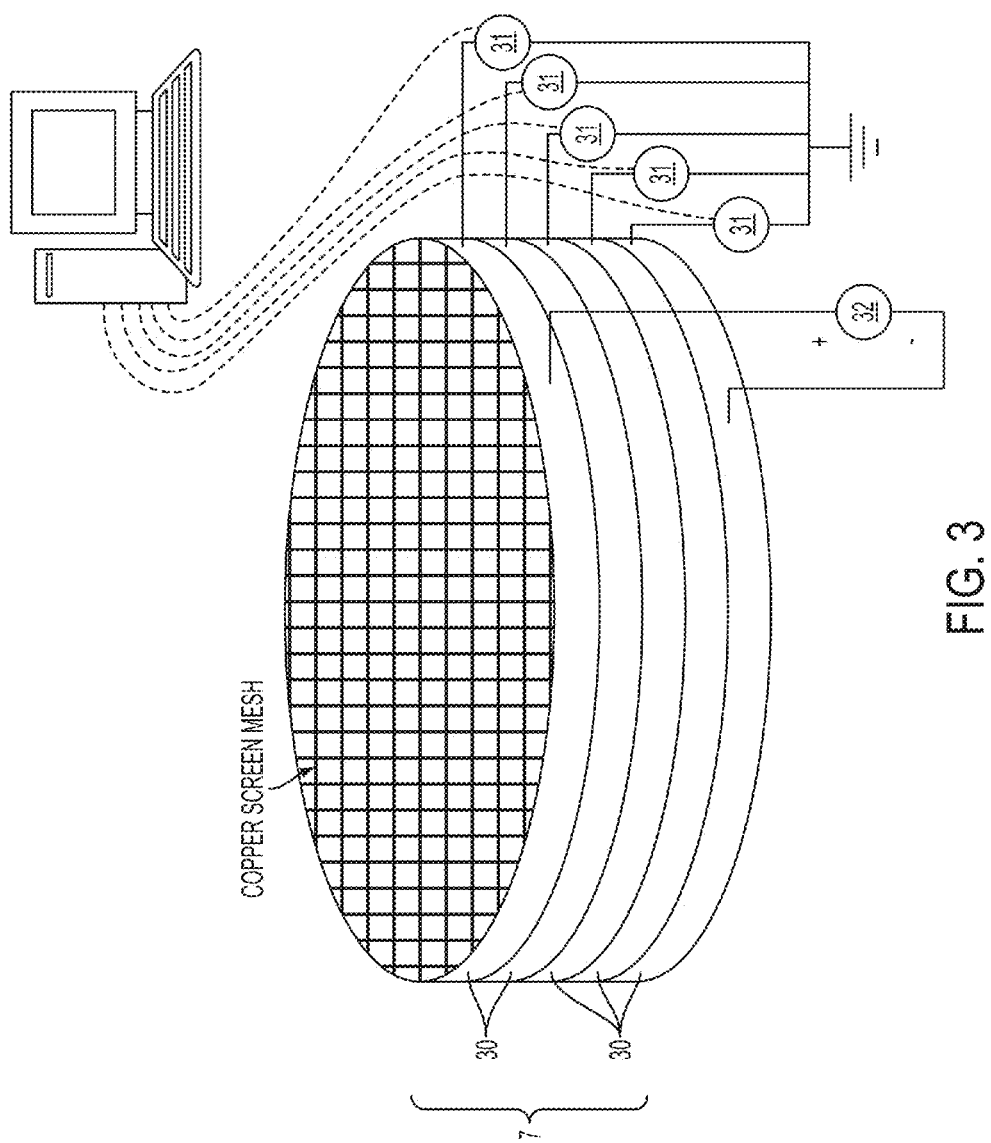
FIG. 3 is an exemplary illustration of a neutron-interaction material for emitting photons used to create an image of a path of the recoiled nucleus.

In another technique for determining the vertical angle, the electron-interaction material 7 may be made of a plurality of layers 30 of an electron-interaction material as illustrated in FIG. 3. In the embodiment of FIG. 3, each layer 30 is made of a copper screen mesh. Coupled to each layer in the plurality of layers is a voltage sensor 31, which provides a voltage measurement to the processor 4. Each voltage sensor 31 is configured to measure the voltage of the associated copper screen mesh layer 30. The electrons released by ionization will interact with one or more of the layers 30 and be sensed by the corresponding voltage sensor 31 and counted by the processing system 4. A voltage source 32 may be coupled to two layers 30 to create a voltage gap that may cause an electron avalanche upon interaction with one or more received electrons. The electron avalanche may cause electron amplification of the received electrons in order to amplify the emitted photons to produce an enhanced image. This technique is similar to the first technique in that the length of the path of light (ML) in the image is measured and the three-dimensional path length (EL) is estimated based on a measurement of the total energy of the incoming neutron. However, in this technique, the total energy of the incoming neutron is measured by counting the number of received electrons using the voltage sensors 31 coupled to the processing system 4. The total number of electrons received by the electron-interaction material 7 is proportional to the total number of ionized electrons and the total number of ionized electrons is proportional to the recoil nucleus energy. The recoil nucleus energy is in turn related to the energy of the incoming neutron. Thus, the collection of electrons in the electron-interaction material 7 may be used to determine the angle $\alpha$ as in the first technique.

In lieu of or in combination with the geometric analysis, the neutron detector 3 can be calibrated in a laboratory using incoming neutrons entering at various vertical angles and recording the corresponding voltage measurements for the screen mesh layers for the various angles. In one or more embodiments, the number of layers 30 can range from five to fifty although more or fewer layers may also be used. It can be appreciated that as the number of layers 30 increases the accuracy and precision of determining the vertical angle also increases.

In yet another technique, the electrons received by the electron-interaction material 7 may be recorded as a function of time to produce a series of received electron arrival times. The angle $\alpha$ may be determined by analyzing the arrival times of the individual received electrons using the processing system 4. The electrons ionized by the recoil nucleus traveling parallel to a plane of the electron-interaction material 7 will arrive at the electron-interaction material 7 simultaneously, while electrons ionized by the recoil coil nucleus traveling with a vector component perpendicular to the plane will arrive with arrival times spread out over a longer interval. The arrival time distribution of the received electrons may be used to determine the angle $\alpha$.

In lieu of or in combination with the geometric analysis, the neutron detector 3 can be calibrated in a laboratory using incoming neutrons entering at various vertical angles and recording the corresponding electron arrival time distributions for the various angles.

Referring again to FIG. 1, the processing system 4 is configured to receive an image from the imager 8 and an orientation of the neutron detector 3 from the orientation sensor 5. The orientation sensor 5, in one or more embodiments, may be an electronic digital compass, which indicates direction by sensing the earth's magnetic field and transmits the sensed direction to the processing system 4. In one or more embodiments, the orientation sensor 5 may be a Global Positioning System (GPS) device configured to determine a direction with respect to true north. In one or more embodiments, the sensed or determined direction is transmitted via a USB (Universal Serial Bus) connection. In one or more embodiments, the electron-interaction material 7 or the imager 8 includes a reference line such that the orientation sensor 5 can determine the orientation or direction of the line in two-dimensional space. From this information, the processor 4 can be configured to determine the direction of the imaged path with respect to the reference line (angle $\beta$ in FIG. 1) and, thus, with respect to magnetic or true north.

Figure 4:
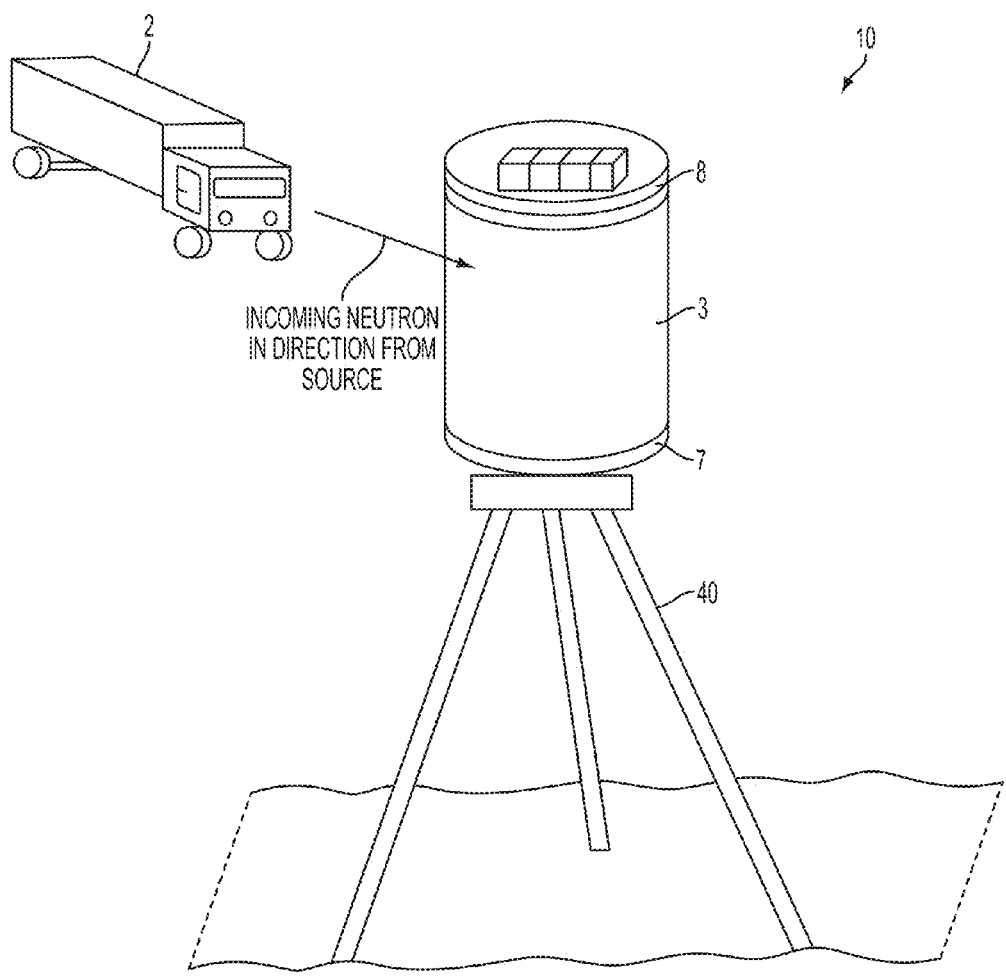
FIG. 4 is an exemplary illustration of a tripod supporting a portable neutron detector that is included in the portable neutron detection system.

The system 10 for locating a direction from a neutron emitting source can assume various configurations. In one or more embodiments, the neutron detector 3, the orientation sensor 5, and the processor 4 are mechanically coupled together to form a single unit. Alternatively, the processor 4 can be disposed remote from the neutron detector 3 and the orientation sensor 5, which are mechanically coupled together. In this embodiment, an interface 12 (wireless, wired, or optical) may transmit the image from the imager 8 and the measured orientation from the orientation sensor 5 to the processor 4 for processing. In yet another embodiment, the neutron detector 3, the orientation sensor 5, and the processor 4 are mechanically coupled together to form a single unit and the interface 12 transmits a computed direction of the neutron emitting source to a remote receiver. It can be appreciated that the utility of the system 10 can be increased by mechanically coupling a tripod 40 to the neutron detector 3 as illustrated in FIG. 4. Because the system 10 may be portable, the tripod 40, generally a folding tripod, can decrease the deployment time of the system 10.

Figure 5:
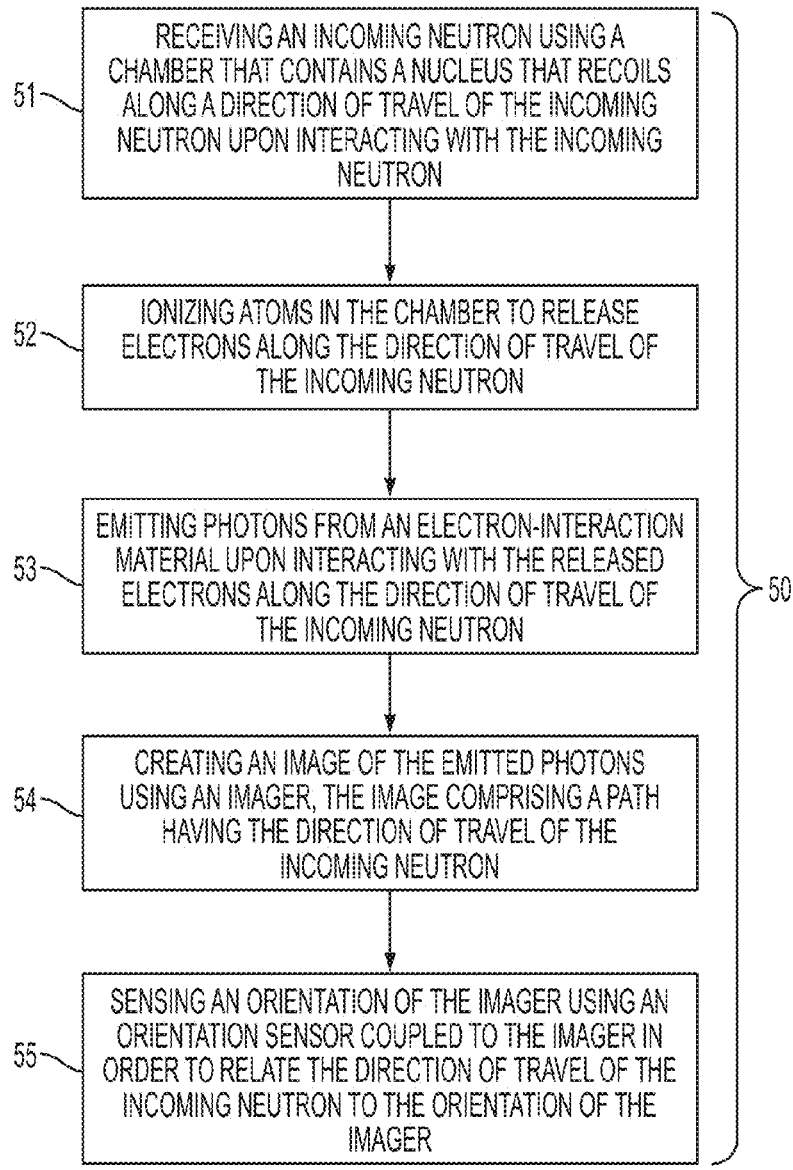
FIG. 5 is a flow diagram of an exemplary method for determining a direction from a neutron emitting source.

FIG. 5 is a flow diagram illustrating a method 50 for determining a direction of travel of a neutron emitted from a source in accordance with an exemplary embodiment. The direction is generally the direction from the neutron emitting source to the neutron detector 3 and is generally determined with respect to magnetic or true north. However, other directional measurement systems or units may be used. Block 51 calls for receiving an incoming neutron using a chamber that contains a nucleus that recoils along a direction of the incoming neutron upon interacting with the incoming neutron. Block 52 calls for ionizing atoms in the chamber to release electrons along the direction of the incoming neutron. Block 53 calls for emitting photons from an electron-interaction material upon interacting with the released electrons along the direction of the incoming neutron. Block 54 calls for creating an image of the emitted photons using an imager, the image comprising a path having the direction of the incoming neutron. Block 55 calls for sensing an orientation of the imager using an orientation sensor coupled to the imager in order to relate the direction of travel of the incoming neutron to the orientation of the imager. Conversely, the direction to the neutron emitting source from the neutron detector can be determined by adding 180 degrees to the determined direction from the source.

It can be appreciated that the system 10 has several advantages. On advantage is that the system 10 is portable. In one embodiment, the neutron detector 3 may have a cylindrical shape with a diameter of three-quarters of a meter and a length of one meter. However, it can also be made larger or smaller. Hence, the system 10 can be quickly transported, such as by motor vehicle, train, or aircraft, with little effort to a location perceived as posing a threat. Another advantage is the ability to quickly deploy or setup the system 10 upon arrival at the selected location. The orientation sensor 5 coupled to the imager 8 precludes the need of a survey team to survey the location for placement of the system 10.

In support of the teachings herein, various analysis components may be used, including a digital and/or an analog system. For example, the processing system 4, the orientation sensor 5, the imager 8, or the voltage sensor 31 may include the digital and/or analog system. The system may have components such as a processor, storage media, memory, input, output, communications link (wired, wireless, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The term "couple" relates to one component being coupled either directly to another component or indirectly via one or more intermediate components.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

While the disclosure has been described with reference to a preferred embodiment or embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. An apparatus for determining a direction of travel of a neutron emitted from a source, the apparatus comprising:
    a chamber containing (i) nuclei that recoil upon interaction with an incoming neutron along a path direction of travel of the incoming neutron from a source of the neutron to the chamber and (ii) atoms capable of being ionized by the recoiled nuclei thereby releasing electrons;
    an electron-interaction material disposed at the chamber and configured to receive electrons released by the ionized atoms and to emit photons upon the interaction with the received electrons along the path direction;
    an imager configured to form an image of photons emitted by the electron-interaction material, wherein the image comprises the path direction of travel of the incoming neutron;
    an orientation sensor configured to sense an azimuthal orientation direction of the imager in order to relate the path direction of travel of the incoming neutron to the azimuthal orientation direction of the imager; and
    a processor configured to receive the image and the azimuthal orientation direction of the imager and to determine the direction of travel of the neutron emitted from the source using the path direction in the image directly and the azimuthal orientation direction.

2. The apparatus according to claim 1, wherein the electron interaction material comprises a plane and the direction of travel is defined in two dimensions within the plane.

3. The apparatus according to claim 1, wherein the direction is defined in three dimensions.

4. The apparatus according to claim 3, wherein the processor is further configured to:
    count a total number of photons emitted by the electron-interaction material;
    determine an expected three-dimensional path length (EL) of a nucleus recoiled by an interaction with the incoming neutron using the counted total number of photons;
    measure a length of the path (ML) in the image; and
    determine an angle ($\alpha$) of the direction of travel of the incoming neutron with respect to the plane in the electron-interaction material using the length of the path in the image and the expected three dimensional path length.

5. The apparatus according to claim 3, wherein the electron interaction material comprises a plurality of layers in a configuration where one or more of the layers interact with the received electrons.

6. The apparatus according to claim 5, wherein each of the layers comprises a copper screen mesh.

7. The apparatus according to claim 6, the apparatus further comprising a voltage sensor coupled to each of the layers and to the processor, wherein the processor is configured to:
    count the total number of electrons received in the electron-interaction material;
    determine an expected three-dimensional path length (EL) of a nucleus recoiled by an interaction with the incoming neutron using the counted total number of electrons;
    measure a length of the path (ML) in the image; and
    determine an angle ($\alpha$) of the direction of travel of the incoming neutron with respect to the plane in the electron-interaction material using the length of the path in the image and the expected three dimensional path length.

8. The apparatus according to claim 6, further comprising at least one voltage source coupled to at least two of the layers and configured to apply a voltage difference to the layers to create an avalanche of electrons from one or more received electrons in order to amplify a number of photons emitted by the electron interaction material.

9. The apparatus according to claim 1, wherein the image further comprises information related to an energy of the incoming neutron.

10. The apparatus according to claim 1, wherein the imager comprises an imaging plane and the electron-interaction material comprises a plane that is parallel to the imaging plane.

11. The apparatus according to claim 1, further comprising a lens configured to focus the released electrons onto the imager.

12. The apparatus according to claim 1, wherein the orientation sensor is configured to sense an earth's magnetic field to determine the azimuthal orientation direction of the imager or to use Global Positioning System information to determine the azimuthal orientation direction.

13. The apparatus according to claim 1, wherein the processor is further configured to determine an angle $\beta$ of the path in the image with respect to a reference line.

14. The apparatus according to claim 1, wherein the imager comprises a charge-coupled device camera.

15. A method for determining a direction of travel of a neutron emitted from a source, the method comprising:
    receiving an incoming neutron using a chamber that contains a nucleus that recoils along a path direction of travel of the incoming neutron upon interacting with the incoming neutron;
    ionizing atoms in the chamber to release electrons along the path direction of travel of the incoming neutron;
    emitting photons from an electron-interaction material upon interacting with the released electrons along the path direction of travel of the incoming neutron;

creating an image of the emitted photons using an imager, the image comprising a the path direction of travel of the incoming neutron; and sensing an azimuthal orientation direction of the imager using an orientation sensor coupled to the imager in order to relate the path direction of travel of the incoming neutron to the azimuthal orientation direction of the imager.

16. The method according to claim 15, further comprising determining the direction of travel of the neutron using a processor that receives the image and the sensed azimuthal orientation direction, wherein processor determines the direction of travel of the neutron using the path direction in the image directly and the azimuthal orientation direction.

17. The method according to claim 16, further comprising determining an angle of the path in the image with respect to a reference line and an angle of the reference line with respect to the azimuthal orientation direction sensed by the orientation sensor to determine a direction from the imager to the source in order to determine the direction from the source.

18. The method according to claim 16, further comprising transmitting the image and the sensed azimuthal orientation direction to the processor using a wireless interface.

19. A non-transitory computer readable medium comprising computer executable instructions for determining a direction of travel of a neutron emitted from a source by implementing a method comprising:

receiving an image created by an imager comprising a path having the direction of travel of the neutron;

receiving an azimuthal orientation direction sensed by an orientation sensor attached to the imager in order to relate the direction of travel of the incoming neutron to the azimuthal orientation direction of the imager; and determining the direction of travel of the neutron using the path direction in the received image directly and the received azimuthal orientation direction.

\* \* \* \* \*